United States Patent
Ji et al.

(10) Patent No.: US 7,697,438 B2
(45) Date of Patent: Apr. 13, 2010

(54) METHOD OF ROUTING PACKET

(75) Inventors: Minwen Ji, Sunnyvale, CA (US);
George M. Porter, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1732 days.

(21) Appl. No.: 10/844,902

(22) Filed: May 12, 2004

(65) Prior Publication Data

US 2005/0267985 A1  Dec. 1, 2005

(51) Int. Cl.
*H04L 12/28* (2006.01)
*G06F 15/00* (2006.01)

(52) U.S. Cl. .................. 370/238; 370/351; 709/239

(58) Field of Classification Search ............... 370/230, 370/231, 254–256, 468, 235, 237, 238, 351–356; 709/222, 238–241
See application file for complete search history.

(56) References Cited

U.S. PATENT DOCUMENTS

| | | | | |
|---|---|---|---|---|
| 4,644,532 A | * | 2/1987 | George et al. | 370/255 |
| 4,905,233 A | * | 2/1990 | Cain et al. | 370/237 |
| 5,253,248 A | * | 10/1993 | Dravida et al. | 370/228 |
| 6,034,946 A | * | 3/2000 | Roginsky et al. | 370/238 |
| 6,144,639 A | * | 11/2000 | Zhao et al. | 370/235 |
| 6,640,248 B1 | * | 10/2003 | Jorgensen | 709/226 |
| 6,667,958 B2 | * | 12/2003 | Phan et al. | 370/238 |
| 7,330,436 B2 | * | 2/2008 | Fabre et al. | 370/238.1 |
| 7,382,767 B2 | * | 6/2008 | Stumer | 370/352 |
| 2003/0149787 A1 | * | 8/2003 | Mangan | 709/238 |
| 2003/0174654 A1 | * | 9/2003 | Tateson et al. | 370/238 |

FOREIGN PATENT DOCUMENTS

JP  407221779 A  *  8/1995

OTHER PUBLICATIONS

Harry Rudin, "On Routing and "Delta Routing""A Taxonomy and Performance Comparison of Techniques for Packet Switched Networks, IEEE, 1976, pp. 43-59.*
Diamantis Kourkouzelis, "Multipath Routing Using Diffusing Computations", A thesis submitted in partial satisfaction of the requirements for the degree of Master of Science in Computer Engineering, Mar. 1997.*
Understanding Virtual Private Networking, ADTRAN, Inc., Huntsville, AL, 2001.
Cassandras, C.G., et al., Distributed Routing with On-Line Marginal Delay Estimation, IEEE Transactions on Communications, vol. 38, No. 3, Mar. 1990, pp. 348-359.

(Continued)

*Primary Examiner*—Aung S Moe
*Assistant Examiner*—Habte Mered (57) ABSTRACT

An embodiment of a method of routing a packet between nodes of a network begins with a step of determining that a route of an external network from a source node to a network node provides an expected near minimum transmission time for transmission of the packet from the source node to a destination node. The method continues with a step of determining that a packet queue for a network link at a source node exceeds a threshold. The method concludes with a step of routing the packet to the destination node via the external network and the network node.

30 Claims, 2 Drawing Sheets

OTHER PUBLICATIONS

Kourkouzelis, D., Multipath Routing Using Diffusing Computations, Master of Science Thesis, University of California, Santa Cruz, CA, Mar. 1997.

Porter, G., Ji, M., Delta Routing: Improving Price-Performance of Hybrid Private Networks, Dec. 2003, Retrieved from < http://www.cs.berkeley.edu/~ gporter/pubs/noms_gpmj.pdf> on Mar. 16, 2004.

Porter G.M., Traffic Matrix Estimation for Low-loss Routing in Hybrid Networks, Master of Science Research Project, University of California, Berkeley, CA, May 22, 2003.

Su, X., et al., Dynamic multi-path routing: asymptotic approximation and simulations, 2001.

Vutukury, S., et al., A Simple Approximation to Minimum-Delay Routing, 1999.

Wang, Z., et al., Shortest Path First with Emergency Exits, Proc. ACM SIGCOMM, Philadelphia, PA, Sep. 1990, pp. 166-176.

Zaumen, T.W., et al., Loop-Free Multipath Routing Using Generalized Diffusing Computations, 1998.

U.S. Appl. No. 10/687,798, Ji, M., filed Oct. 17, 2003.

* cited by examiner

METHOD OF ROUTING PACKET

FIELD OF THE INVENTION

The present invention relates to the field of networking. More particularly, the present invention relates to the field of networking where a routing protocol routes packets between nodes of a network.

BACKGROUND OF THE INVENTION

Large enterprises often rely on private networks for internal data communication. Such internal data communication includes internal e-mail, internal web access, and internal database access as well as internal streaming media, file sharing, and file transferring. Data communication which uses the private networks is protected from external security attacks, including eavesdropping and tampering. Data communication over private networks is expected to increase as large enterprises place more activities on-line and as new applications such as streaming media develop and mature.

Private networks are built from physically private communication channels such as leased lines, Frame Relay links, and ATM (asynchronous transfer mode) links. A private network is dedicated to an enterprise's traffic. It has dependable and guaranteed performance characteristics including predictable transmission time (i.e., delay) and bandwidth. The private network also has a low loss rate provided that traffic does not approach the bandwidth for an extended period of time or that the traffic does not exceed the bandwidth. However, the private network is expensive. In many cases, an enterprise must pay for bandwidth regardless of whether it is used. Due to limited budgets, an enterprise will normally choose to not purchase significantly more capacity than the enterprise expects to use. For such an enterprise, flash traffic or a sudden large bandwidth flow can cause congestion which results in increased delays as packet queues grow and lost packets as the packet queues overflow.

Typically, a private network will include gateways to the Internet via ISPs (Internet service providers), which provide connectivity between the private network and the Internet. Such connectivity exists for many reasons including providing employees with quick access to resources and services on the Internet. Generally, the private network will have multiple gateways to the Internet with each gateway providing connectivity to the Internet for a locale. This provides lower delays when accessing the Internet. This also conserves bandwidth along the private network since traffic bound for and returning from the Internet does not travel along significant portions of the private network.

A VPN (virtual private network) includes two or more sites coupled together by IP (Internet protocol) tunnels. An IP tunnel between two sites encrypts packets at the first site, transmits the packets over the Internet to the second site, decrypts the packets at the second site, and utilizes authentication to detect packet tampering between the first and second sites. Private networks are inherently secure. In contrast, Internet-based VPNs provide security through encryption and authentication. Relative to private networks, VPNs are inexpensive. However, VPNs provide lower quality of service compared to private networks. Because the VPNs make use of the Internet and because the Internet is shared among many users, it is not possible to guarantee loss rate, delay, or bandwidth. Even within a single communication session, it is possible to experience a wide range of delays and bandwidths. Because of these limitations, large enterprises use private networks for internal traffic and make use of VPNs when connecting home users, small isolated offices, or partners to their private networks.

Because flash traffic or a sudden large bandwidth flow on a private network can cause increased delays and can result in lost packets, it would be desirable to be able to use an Internet-based VPN to route some private network traffic. However, because of the Internet's shifting delay and bandwidth characteristics, a technique for assuring efficient use of the private network and the VPN is needed. More generally, there is a need for a routing protocol which routes some network traffic over an internal network and other network traffic over an external network.

What is needed is a method of routing a packet between nodes of a network by routing the packet at least partly over an external network.

SUMMARY OF THE INVENTION

The present invention comprises a method of routing a packet between nodes of a network. According to an embodiment, the method begins with a step of determining that a route of an external network from a source node to a network node provides an expected near minimum transmission time for transmission of the packet from the source node to a destination node. The method continues with a step of determining that a packet queue for a network link at a source node exceeds a threshold. The method concludes with a step of routing the packet to the destination node via the external network and the network node.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention comprises a method of routing a packet from a source node to a destination node of a network by routing the packet at least partially over an external network. According to an embodiment, the method of routing the packet routes the packet along with other packets. According to this embodiment, the method routes a plurality of packets from the source node to the destination node of the network by routing the packets at least partially over the external network. According to an embodiment which routes the plurality of packets, the plurality of packets comprises at least a portion of a stream of packets. The stream of packets comprises a single communication from the source node to the destination node. According to an embodiment, the stream of packets originates at the source node. According to another embodiment, the stream of packets originates at another node.

Figure 1:
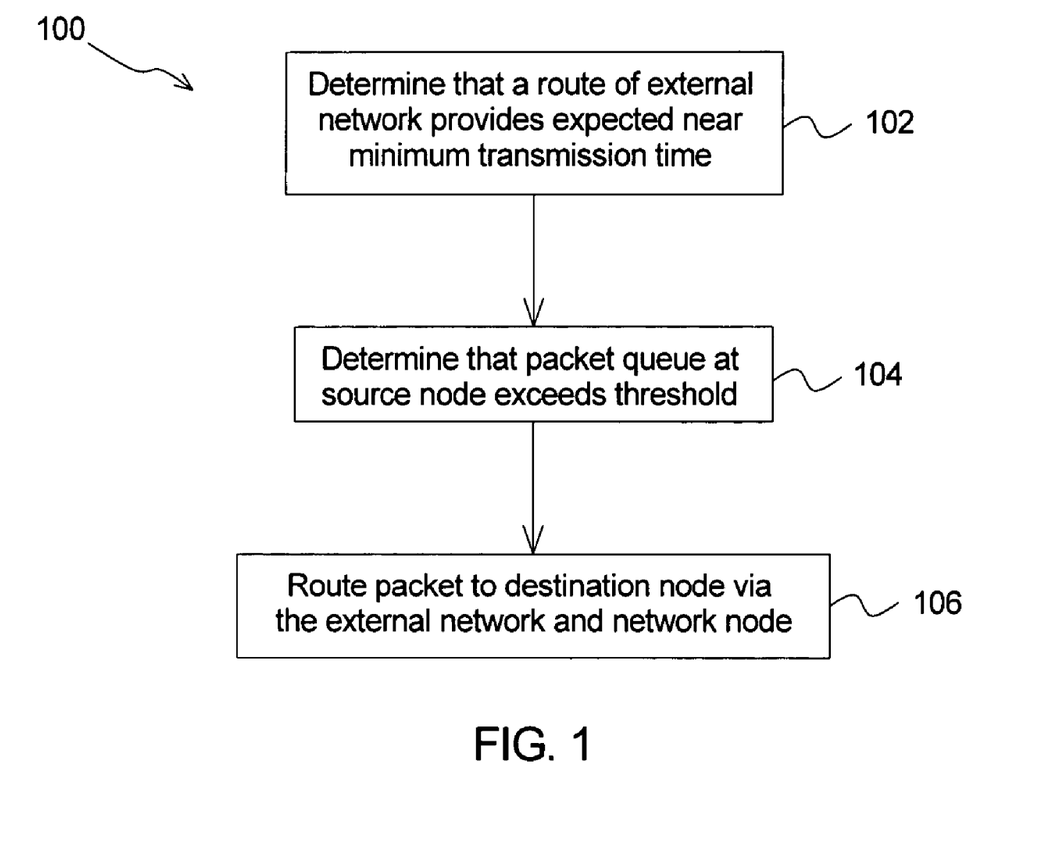
FIG. 1 illustrates an embodiment of a method of routing a packet between nodes of a network of the present invention as a flow chart.

An embodiment of the method of routing the packet from the source node to the destination node of the present invention is illustrated as a flow chart in FIG. 1. The method 100 begins with a first step 102 of determining that a route of the external network provides an expected near minimum transmission time for transmission of the packet from the source node to the destination node. According to an embodiment, the expected near minimum transmission time is based at least in part upon an expectation of a delay at the source node. According to another embodiment, the expected near minimum transmission time is based at least in part upon an expectation of a packet loss at the source node.

According to an embodiment, the network and an external network comprise a hybrid network. According to an embodiment, the network comprises a private network. According to an embodiment, the private network comprises a corporate network. According to an embodiment, the private network comprises an intranet. According to embodiments, the private network comprises a leased lines network, a frame relay network, or a network of ATM (asynchronous transfer mode) links.

According to an embodiment, the external network comprises the Internet. According to another embodiment, the external network comprises another public network. According to yet another embodiment, the external network comprises some other network that is external to the network such as another intranet or another private network.

Figure 2:
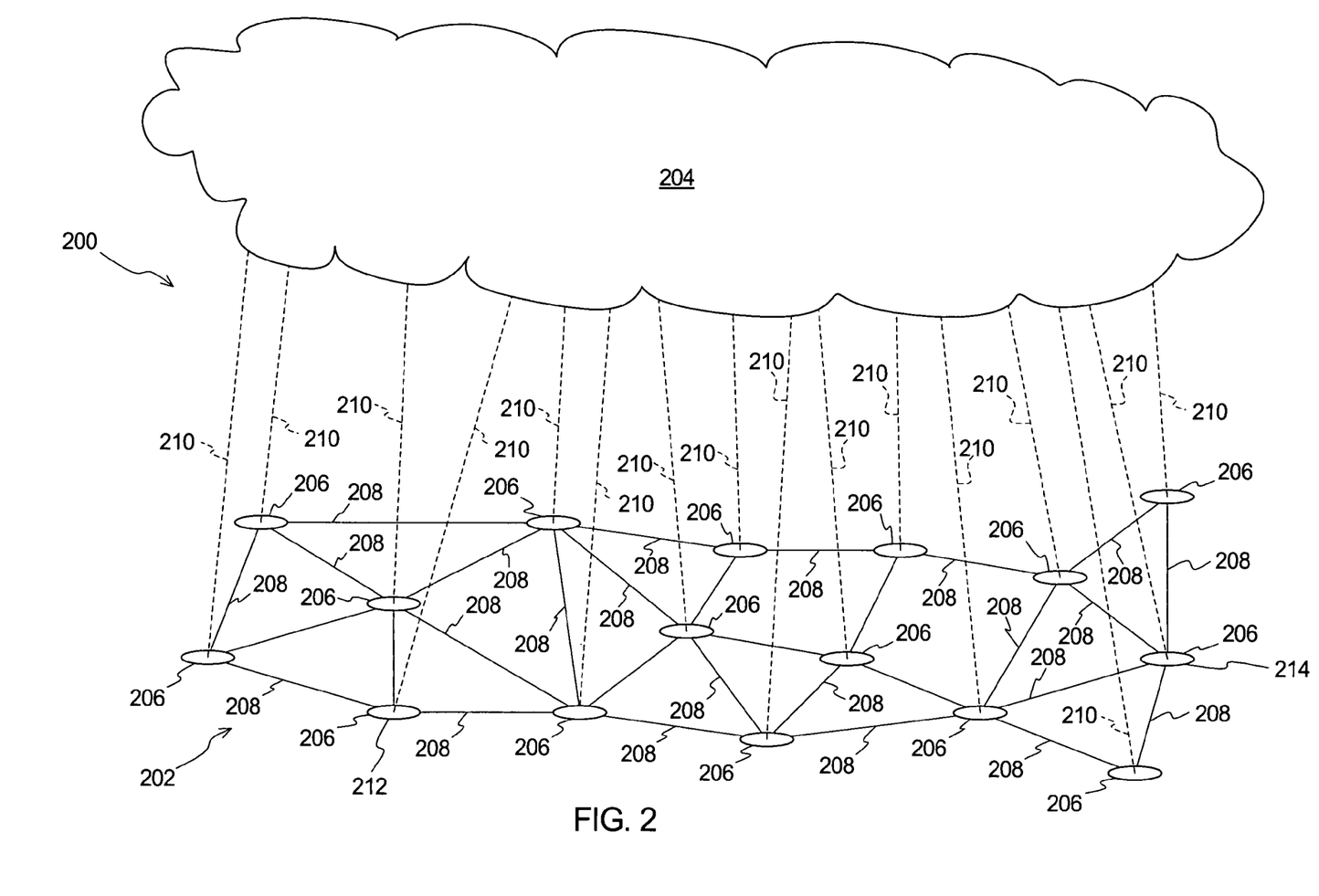
FIG. 2 schematically illustrates an embodiment of a hybrid network which employs a method of routing a packet of the present invention.

An embodiment of a hybrid network upon which the method 100 routes the packet is illustrated schematically in FIG. 2. The hybrid network 200 comprises the network 202 and the external network 204. The network 202 comprises nodes 206 coupled together by network links 208. According to an embodiment, the nodes 206 comprise routers. According to another embodiment, the nodes 206 comprise hosts. According to another embodiment, the nodes 206 comprise a mixture of routers and hosts. The nodes 206 comprise gateway nodes which couple to the external network 204 via gateway links 210. According to an embodiment in which the external network 204 comprises the Internet, the gateway links 210 are provided by one or more ISPs (Internet service providers). The network 202 employs a base routing protocol to determine a base route for a packet traveling from a source node 212 to a destination node 214. According to an embodiment, the base routing protocol comprises a RIP (routing information protocol) routing protocol. According to another embodiment, the base routing protocol comprises an OSPF (open shortest path first) routing protocol. According to another embodiment, the base routing protocol comprises another routing protocol.

According to an embodiment, the packet originates at the source node 212. According to this embodiment, the packet begins its journey to the destination 214 at the source node 212. According to another embodiment, another of the nodes 206 sends the packet to the source node 212 as part of a routing from the other node to the destination node 214.

According to an embodiment of the method 100 (FIG. 1), each of the nodes 206 (FIG. 2) determines a base routing transmission time from itself to the destination node 214 and employs the base routing protocol to transmit the base routing transmission time to the source node 212. The source node 212 compares the base routing transmission times for others of the nodes 206 to its base routing transmission time and identifies the nodes 206 that have shorter base routing transmission times as candidate nodes.

According to another embodiment of the method 100, the source node 212 maintains a network link latency matrix as part of the base routing protocol for the source node 212. The network link latency matrix comprises latencies for the network links 208. Transmission time over a network link from a first node to a second node comprises a queue delay at the first node and a latency. The queue delay is the time that a packet waits at a node. Queue delays vary over time. The latency is the time it takes the packet to travel from the first node to the second node along the network link. Latencies tend to be stable over time. The source node 212 uses the network link latency matrix and a topology of the network 202 to determine a base routing latency matrix. Elements of the base routing latency matrix indicate base routing latencies from any node of the network 202 to any other node of the network. According to an embodiment, the base routing latencies comprise approximations for the base routing transmission times between nodes of the network 202. According to this embodiment, the source node 212 compares the base routing latencies for others of the nodes 206 to its base routing latency and identifies the nodes 206 that have shorter base routing latencies than the source node's base routing latency as the candidate nodes.

According to an embodiment of the method 100, the source node 212 occasionally collects external network transmission times for packets sent to others of the nodes 206 via the external network. According to an embodiment, the packets sent to others of the nodes 206 comprise packets within a regular communication over the external network. According to another embodiment, the packets comprise messages sent to measure transmission times. According to an embodiment, a receiving node determines the external network transmission time by comparing a sent time of a message header to a receipt time. The receiving node then sends the external network transmission time to the source node 212. According to this embodiment, the nodes 206 employ synchronized clocks.

According to another embodiment, the source node 212 occasionally sends pings to others of the nodes 206 via the external network and measures a round trip time to and from each of the nodes 206. To its benefit, this embodiment need not employ the synchronized clocks on the nodes 206. However, according to this embodiment, the source node 212 estimates the external network transmission times as half of the round trip times. This assumes that each leg of the round trip is half of the round trip transmission time. Thus, the external network transmission time determined according to this embodiment comprises an estimated external network transmission time.

The estimated external network transmission time will not, in general, present a problem in the context of the present invention. This is shown by examining extreme cases for the estimated external network transmission time. According to a first situation, a bulk of the round trip time is spent propagating the ping to a remote node and a return trip is very fast. This will result in an estimated external network transmission time that is slightly more than half of an actual external network transmission time. If the remote node is selected as an endpoint of the route along the external network, a resulting overall transmission time for the packet from the source node 212 to the destination node 214 could be slightly greater than an optimal overall transmission time (i.e., a minimum overall transmission time obtainable by sending the packet over the external network to another node). The resulting overall transmission time will, in general, be acceptable for at least two reasons. First, such a situation is expected to be rare so an overall performance for the hybrid network will not be affected. Second, in general, there will be many possible external network routes and even if the actual external network transmission time is twice the estimated external network transmission time the route over the external network should avoid more heavily burdened regions of the external network.

According to a second situation, the bulk of the round trip time is spent on the return trip. This will result in an estimated external network transmission time that is much greater than the actual external network transmission time. This could result in rejection of the remote node as the endpoint for the route on the external network when it could have provided the optimal transmission time. This is not expected to be a problem because in general there will be a sufficient number of the candidate nodes to ensure that a near optimal transmission time is achieved.

According to an embodiment of the first step 102, the source node 212 sums the base routing transmission time and the external network transmission time for each of the candidate nodes to determine expected transmission times from the source node 212 to the destination node 214 via the external network 204 and the candidate nodes. The source node 212 identifies a minimum from the expected transmission times and, thus, identifies a particular candidate node that provides an expected minimum transmission time for routing the packet from the source node 212 to the destination node 214 via the external network 204 and the particular candidate node.

For at least four reasons, the expected minimum transmission time is more accurately characterized as an expected near minimum transmission time. First, the expected transmission time is a forecast of a future transmission time and conditions on the external network 204 and, to a lesser degree, the network 202 will likely change. By selecting appropriate update time periods for estimating the external network transmission times and the base routing transmission times, this effect can be reduced but not eliminated. According to an embodiment, the update time period for the external network transmission times is on an order of from seconds to minutes. According to an embodiment, the update time period for the base routing transmission times is on an order of from hours to a day. In general it is expected that the external network transmission times will change more quickly than the base routing transmission times. Accordingly, the external network transmission times are updated more often than the base routing times. Of course, as the method 100 is employed upon a particular network and a particular external network, updates for the external network transmission times and the base routing transmission times can be chosen based upon experience.

Second, for the embodiment in which the nodes 206 include the synchronized clocks, one or more of the synchronized clocks may be slightly out of synchronization at a particular time. This can be minimized by maintaining the synchronization of the synchronized clocks within an allowable limit. Third, for the embodiment which estimates the external network transmission times using the pings, determination of the external network transmission time comprises an estimate as discussed above. Fourth, a downstream congestion may arise causing an intermediate node between the particular candidate node and the destination node 214 to route the packet to the external network 204 a second time incurring delay that might have been avoided by selecting a different candidate node. An alternative embodiment discussed below addresses detecting and avoiding at least some of the downstream congestion.

The method 100 (FIG. 1) continues in a second step 104 in which the source node 212 (FIG. 2) determines that a packet queue for a network link at the source node exceeds a threshold. When the packet queue exceeds the threshold, congestion exists on the network link. According to an embodiment, the threshold comprises the packet queue having a single remaining slot. According to this embodiment, the packet queue contains no available slots when the packet queue exceeds the threshold.

According to another embodiment, the threshold comprises a number of remaining slots. According to an embodiment in which the threshold comprises a number of remaining slots, the source node 212 routes packets that form part of a non-critical communication via the external network 204 and routes packets that form part of a critical communication along the network link 208 until the packet queue drops to the threshold or lower. The non-critical communication comprises a communication in which delay or packet loss is tolerable such as e-mail. The critical communication comprises a communication in which delay or packet loss will be deleterious such as database access or streaming media.

The method 100 concludes in a third step 106 in which the source node 212 routes the packet to the destination node 214 via the external network 204 and the particular candidate node determined in the first step 102. While an actual route to the destination node 214 includes the external network 204 and the particular candidate node, specific intermediate nodes of the external network are chosen by a routing protocol of the external network which is independent of the method 100. Further, while the network transmission times for the candidate nodes to the destination node 214 is based in part upon a base route from the particular candidate node, another route may be employed when the packet is sent to the particular candidate node via the external network 204. Further, the particular candidate node may be the destination node 214 in which case there is no routing from the particular candidate node to the destination node 214.

According to an embodiment, each of the nodes 206 employs an instance of the method 100 in which each instance at least performs the first step 102 in anticipation of the packet queue for a network link exceeding the threshold. According to this embodiment, a downstream node along the base route from the particular candidate node to the destination node 214 may send the packet to the external network 204 a second time upon encountering congestion at the downstream node. Of course, the downstream node might be the particular candidate node which received the packet from the external network 204. In other words, the packet may be routed from the source node 212 to the destination node 214 via the particular candidate node and an instance of the method 100 employed on the particular candidate node may route the packet to the destination node 214 via the external network 204 because a packet queue at the particular candidate node exceeds a threshold.

According to an embodiment in which the external network 204 comprises the Internet, the Internet comprises a VPN (virtual private network) that couples the nodes 206 together. According to an embodiment, the VPN utilizes IP (Internet protocol) tunnels to establish secure communication links on the Internet between the nodes 206. The IP tunnels employ encryption and authentication to securely transmit packets via the Internet.

According to an embodiment, each of the nodes 206 employs a data structure to implement the first step 102 of determining that the route of the external network provides the expected near minimum transmission time for the packet traveling from the node 206 (i.e., a source node) to another of the nodes 206 (i.e., a destination node). The data structure comprises the network link latency matrix, a packet queue vector, and a virtual tunnel vector. The network link latency matrix comprises the latencies for the network links 208 throughout the network 200 (FIG. 2). The network link latency matrix comprises elements $n_{ij}$ which provide the latency for the network link 208 that couples an ith node to a jth node. According to an embodiment, the base routing protocol uses the network latency matrix and the topology of the network 202 to determine the base routes from a particular node to others of the nodes 206. According to an embodiment, each of the nodes 206 also employs the network link latency matrix and the topology of the network 200 to estimate the base routing transmission times in order to identify the candidate nodes.

The packet queue vector comprises queue length elements for network links that couple to a particular node. If the particular node has network links to two other nodes, the packet queue vector comprises two queue length elements. If the particular node has network links to four other nodes, the packet queue vector comprises four queue length elements. The particular node uses the packet queue vector in the second step 104 (FIG. 1) in which a particular node determines that one of the packet queue elements of the packet queue vector exceeds the threshold. According to an embodiment, this triggers the particular node's implementation of the third step 106 of routing the packet via the external network 204 and the particular candidate node.

The virtual tunnel vector comprises the external network transmission times for the particular node. The external transmission times correspond to local tunnels for the particular node. A local tunnel is a tunnel which starts at a particular node. In contrast, a remote tunnel is a tunnel that starts at a node other than the particular node. The particular node uses the external network transmission times of the virtual tunnel vector to determine which of the candidate nodes provides the expected near minimum transmission time.

The data structure comprises information obtained without additional communication over the network 202 and with minimal communication over the external network 204. The network link latency matrix comprises information provided by the base routing protocol. The packet queue vector comprises information local to a particular node. According to an embodiment, the virtual tunnel vector comprises information obtained from an occasional pair of messages between the particular node and each of others of the nodes 206. According to another embodiment, the virtual tunnel vector comprises information obtained from pings sent to others of the nodes 206.

According to an embodiment, an alternative hybrid network which employs the method 100 of the present invention comprises the nodes 206 and additional nodes. The additional nodes comprise non-gateway nodes that do have direct connectivity to the external network 204. For the alternative hybrid network, the additional nodes do not employ the method 100 as source nodes. However, a packet traveling over the network 202 can originate at one of the additional nodes. Further, a packet traveling over the network can traverse one or more of the additional nodes as part of a base route. Further, one of the additional nodes can form a destination node for a packet traveling over the network 202.

The method 100 provides good route convergence, which is a measure of an ability to have all nodes agree on newly computed routes quickly. If a routing protocol for a network has good route convergence, the routing protocol quickly determines a route on the network. If it has poor route convergence, it slowly determines a route on the network. Because the first step 102 determines the particular candidate node with minimal communication among nodes.

The method 100 maintains route stability on the network 202. Since the base routing protocol on the network 202 acts as if the external network 204 does not exist, changes of routes or traffic on the external network 204 will not cause route changes on the network 202.

An embodiment of an alternative method of routing the packet from the source node to the destination node of the network 200 comprises the method 100 and an additional step. The additional step predicts possible downstream congestion and avoids the candidate nodes that would result in the packet encountering the downstream congestion.

According to an embodiment, the additional step employs a traffic matrix that comprises utilization elements corresponding to the network links. Each utilization element comprises an estimate of traffic on a particular network link divided by a bandwidth for the particular network link. When a utilization element for a network link exceeds an allowable utilization threshold, the additional step reduces the candidate nodes to the candidate nodes which do not include the network link on their base routes. According to an embodiment, the utilization elements are occasionally broadcast to the nodes by an originating node for each of the network links. According to another embodiment, the utilization elements are estimated at each of the nodes based upon local traffic at the node.

When the packet routed by the method 100 comprises one of a stream of packets, path oscillation becomes a concern. The path oscillation occurs when the stream of packets is routed over multiple paths and routing of the stream jumps from path to path. In the context of the method 100, the multiple paths comprise the external network 204 and the base route of the network 202. The path oscillation can result in packets within the stream being delivered to the destination node 214 out of order and with a large variance in transmission time for the packets of the stream. For some applications such as streaming media, the path oscillation can result in reduced quality as perceived by a user. For other situations such as with TCP connections, the path oscillation can reduce bandwidth. A method of reducing the path oscillation is taught in U.S. patent application Ser. No. 10/687,798, entitled Traffic Flow Management through a Multipath Network and filed on Oct. 17, 2003, which is hereby incorporated by reference in its entirety.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of routing a packet between nodes of a network comprising the steps of:
   determining a base routing transmission time between each of a plurality of nodes and a destination node, the base routing transmission times being for routes within a restricted access network;
   using a computer-based source node to identify, as candidate nodes, nodes having base routing transmission times that are shorter than a routing transmission time of the source node;
   collecting external routing transmission times for routes through a shared access external network, the shared access external network being connected to the restricted access network;
   using the computer-based source node to, for each candidate node, sum its base routing transmission time with a corresponding external routing transmission time to identify a particular network node that provides an expected near minimum transmission time for transmission of the packet from the source node to the destination node;

determining that a packet queue for a network link at the source node exceeds a threshold; and routing the packet to the destination node via the shared access external network and the particular network node if the threshold is exceeded.

2. The method of claim 1 wherein the route of the shared access external network by which the packet is routed comprises a local tunnel.

3. The method of claim 2 wherein the step of routing the packet to the destination node comprises routing the packet via the local tunnel and a base route from the particular network node to the destination node.

4. The method of claim 1 wherein the network and the shared access external network comprise a hybrid network.

5. The method of claim 1 wherein the packet comprises a particular packet of a 2 stream of packets.

6. The method of claim 5 wherein the step of routing the packet to the destination node via the shared access external network and the particular network node further comprises routing one or more other packets of the stream of packets via the shared access external network and the particular network node.

7. The method of claim 1 wherein the restricted access network comprises an intranet.

8. The method of claim 1 wherein the restricted access network comprises a private network.

9. The method of claim 1 wherein the expected near minimum transmission time comprises an expectation based upon a delay at the source node.

10. The method of claim 1 wherein the expected near minimum transmission time comprises an expectation based upon a loss of the packet at the source node.

11. The method of claim 1 wherein the particular network node comprises the destination node.

12. The method of claim 1 wherein the step of collecting external routing transmission times comprises occasionally measuring transmission times from the source node to candidate nodes.

13. The method of claim 1 wherein the step of routing the packet further comprises routing additional packets to the destination node via the shared access external network and the particular network node.

14. The method of claim 1 wherein the step of routing the packet to the destination node via the shared access external network and the particular network node comprises avoiding congestion on the network link.

15. The method of claim 14 further comprising the step of determining that communication traffic along a downstream network link exceeds a bandwidth threshold.

16. The method of claim 15 further comprising the step of avoiding the downstream network link.

17. The method of claim 14 wherein the step of routing the packet to the destination 2 node via the shared access external network and the particular network node further comprises making use of available bandwidth for the network beyond the congestion.

18. The method of claim 1 wherein the network comprises gateway nodes that couple the network to the shared access external network.

19. The method of claim 18 wherein the gateway nodes include the source node and the particular network node.

20. The method of claim 18 wherein the shared access external network comprises an Internet.

21. The method of claim 20 wherein the step of routing the packet to the destination node via the shared access external network and the particular network node uses a secure tunnel from the source node to the particular network node.

22. The method of claim 21 wherein the secure tunnel utilizes encryption.

23. The method of claim 21 wherein the secure tunnel utilizes authentication.

24. The method of claim 1 wherein the packet comprises at least a portion of a non-critical communication.

25. A method of routing a packet between nodes of a network comprising the steps of:

determining a base routing transmission time between each of a plurality of nodes and a destination node, the base routing transmission times being for routes within a restricted access network;

using a computer-based source node to identify, as candidate nodes, nodes having base routing transmission times that are shorter than a routing transmission time of the source node;

determining that a downstream network link not connected to the source node exceeds a bandwidth threshold;

collecting external routing transmission times for routes through a shared access external network, the shared access external network being connected to the restricted access network;

using the computer-based source node to, for each candidate node, sum its base routing transmission time with a corresponding external routing transmission time to identify a particular network node that provides an expected near minimum transmission time for transmission of the packet from the source node to the destination node and that avoids the downstream network link;

determining that a packet queue for a network link at the source node exceeds a threshold; and routing the packet to the destination node via the shared access external network and the particular network node if the threshold is exceeded at the source node.

26. The method of claim 25 wherein the network comprises gateway nodes that couple the network to the external network.

27. The method of claim 25 wherein the step of routing the packet to the destination node via the external network and the particular network node uses a secure tunnel from the source node to the particular network node.

28. The method of claim 25 further comprising a step of avoiding the downstream network link by eliminating from consideration any candidate node for which the network link is in corresponding route within the restricted access network.

29. A computer readable memory having stored thereon computer code which when executed implements a method of routing a packet between nodes of a network, the method of routing the packet comprising the steps of:

determining a base routing transmission time between each of a plurality of nodes and a destination node, the base routing transmission times being for routes within a restricted access network;

identifying, as candidate nodes, nodes having base routing transmission times that are shorter than a routing transmission time of a source node;

collecting external routing transmission times for routes through a shared access external network, the shared access external network being connected to the restricted access network;

for each candidate node, summing its base routing transmission time with a corresponding external routing transmission time to identify a particular network node that provides an expected near minimum transmission time for transmission of the packet from the source node to the destination node;

determining that a packet queue for a network link at the source node exceeds a threshold; and routing the packet to the destination node via the shared access external network and the particular network node if the threshold is exceeded.

30. A computer readable memory having stored thereon computer code which when executed implements a method of routing a packet between nodes of a network, the method of routing the packet comprising the steps of:

determining a base routing transmission time between each of a plurality of nodes and a destination node, the base routing transmission times being for routes within a restricted access network;

identifying, as candidate nodes, nodes having base routing transmission times that are shorter than a routing transmission time of a source node;

determining that a downstream network link not connected to the source node exceeds a bandwidth threshold;

collecting external routing transmission times for routes through a shared access external network, the shared access external network being connected to the restricted access network;

for each candidate node, summing its base routing transmission time with a corresponding external routing transmission time to identify a particular network node that provides an expected near minimum transmission time for transmission of the packet from the source node to the destination node and that avoids the downstream network link;

determining that a packet queue for a network link at the source node exceeds a threshold; and routing the packet to the destination node via the external network and the particular network node if the threshold is exceeded at the source node.

\* \* \* \* \*

UNITED STATES PATENT AND TRADEMARK OFFICE
CERTIFICATE OF CORRECTION

PATENT NO. : 7,697,438 B2  Page 1 of 1
APPLICATION NO. : 10/844902
DATED : April 13, 2010
INVENTOR(S) : Minwen Ji et al.

It is certified that error appears in the above-identified patent and that said Letters Patent is hereby corrected as shown below:

In column 9, line 16, in Claim 5, after "a" delete "2".

In column 9, line 53, in Claim 17, after "destination" delete "2".

Signed and Sealed this

Twenty-eighth Day of September, 2010

David J. Kappos
*Director of the United States Patent and Trademark Office*